2 Sheets—Sheet 1.

J. M. SEGUR.

HAND CORN PLANTER.

No. 11,095. Reissued July 8, 1890.

WITNESSES
F. Clough.
C. J. Shipley

INVENTOR
Joseph M. Segur
By Mills M. Leggett & Co.
Attorneys.

THE NORRIS PETERS CO., PHOTO-LITHO., WASHINGTON, D. C.

2 Sheets—Sheet 2.

J. M. SEGUR.

HAND CORN PLANTER.

No. 11,095. Reissued July 8, 1890.

WITNESSES

F. Clough

C. J. Shipley

INVENTOR

Joseph M. Segur

By Wells W. Leggett & Co.

Attorneys.

THE NORRIS PETERS CO., PHOTO-LITHO., WASHINGTON, D. C.

UNITED STATES PATENT OFFICE.

JOSEPH M. SEGUR, OF ADRIAN, MICHIGAN.

HAND CORN-PLANTER.

SPECIFICATION forming part of Reissued Letters Patent No. 11,095, dated July 8, 1890.

Original No. 393,669, dated November 27, 1888. Application for reissue filed March 5, 1890. Serial No. 342,825.

*To all whom it may concern:*

Be it known that I, JOSEPH M. SEGUR, a citizen of the United States, residing at Adrian, in the county of Lenawee and State of Michigan, have invented certain new and useful Improvements in Hand Corn-Planters; and I do hereby declare the following to be a full, clear, and exact description of the invention, such as will enable others skilled in the art to which it appertains to make and use the same.

My invention relates to improvements in hand corn-planters; and it consists in certain novelty in the construction and arrangement of the various parts, all of which I will now proceed to point out and describe, reference being had to the accompanying drawings, in which—

Figure 1:
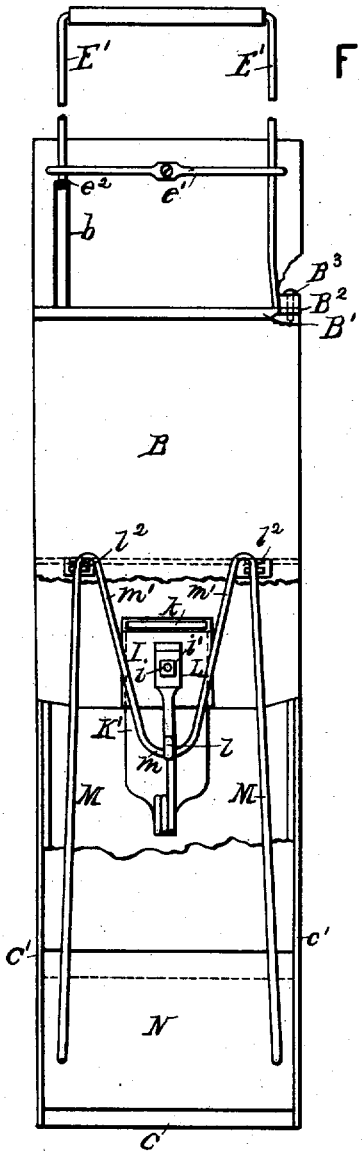
Figure 2:
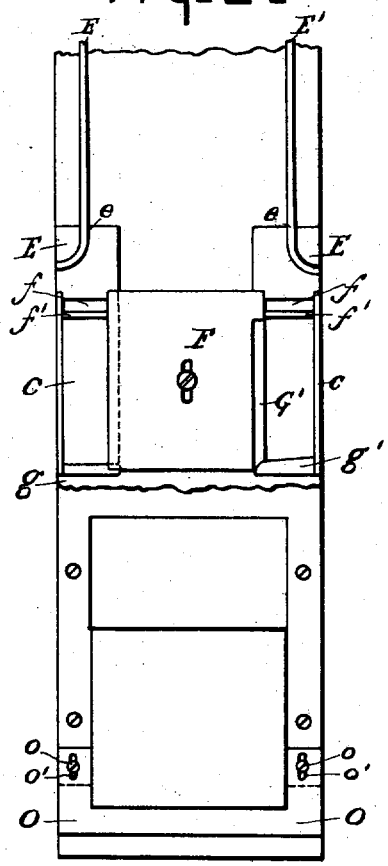
Figure 3:
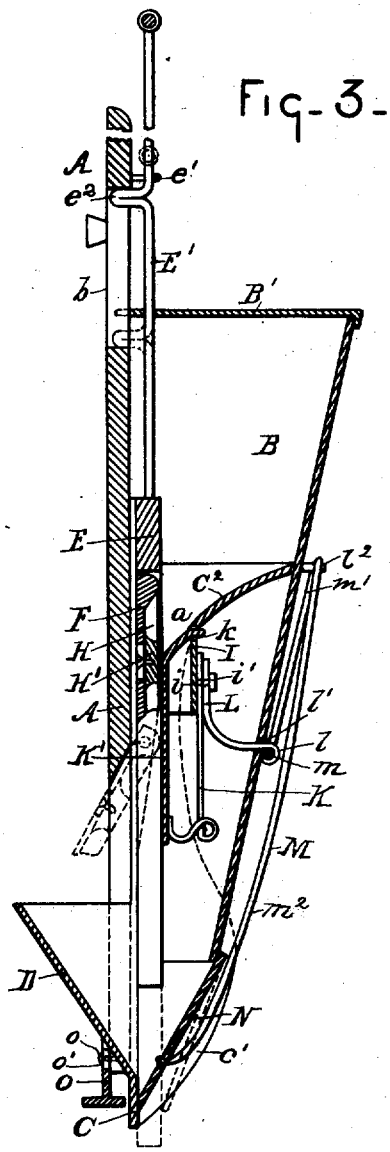
Figure 4:
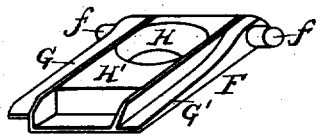
Figure 5:
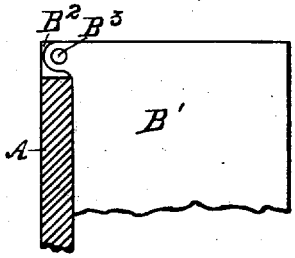

Figure 1 is a front elevation of my improved planter, part of the hopper being broken away. Fig. 2 is a rear elevation, part of the standard being broken away. Fig. 3 is a vertical central section of the same, dotted lines showing the position of the seed-cup at the limit of the downward movement of the plunger. Figs. 4 and 5 are details of various parts of my said invention.

Referring to said drawings, A represents the standard, which is preferably made of wood.

B is the hopper, preferably made of sheet metal, and secured to the sides of the standard. The extreme lower end of the hopper is open.

B′ is the cap or cover for the hopper, hinged or pivoted at one corner to the standard, so that said cover may swing sidewise. I preferably form a slot $B^2$ in the standard. In this one end of the lid is inserted and pivotally secured by a pin $B^3$.

C is a casting secured to the lower end of the standard and located partially within the lower part of the hopper, the lower end of said casting projecting below the standard and forming the portion of the planter which enters the ground. The lower portions of the sides of the casting are extended and form wings $c'$ $c'$, between which the scraper-plate is located. The upper end of the casting extends across the hopper and forms an inclined bottom $c^2$ for said hopper, the center of said bottom having an aperture $a$. On either side of and extending below said aperture parallel with the standard are guides or ways $c$ $c$. Between said guides or ways and the standard the plunger, hereinafter described, is held and reciprocated. The central portion of the casting is cut away or slotted. The lower end of the standard to which said casting is secured is also slotted.

D is an inclined seed-passage, formed as part of the casting and projecting through the slotted end of the standard, the upper end or mouth of the same being open, and is adapted to receive the seed when discharged from the seed-cup, as hereinafter described.

E is the plunger, which is mounted between the guides or ways $c$ $c$ and the standard. The upper end of the plunger is slotted. Said plunger is preferably made of cast metal. In its upper corners are formed two curved grooves $e$ $e$.

E′ is the handle, formed of wrought-iron rods, their lower ends being bent and secured in the curved grooves in the corners of the plunger. These handles may be secured to the plunger in any other desired manner, such as soldering, &c.; but the means shown is preferred. These rods are mounted and held in place by guides $e'$ $e'$, secured to the standard.

$e^2$ is a knee or stop formed in one of the handles. This stop engages with a slot $b$ in the standard. This stop limits the play of the plunger as it is reciprocated.

F is a gate located in the slotted portion of the plunger and extending down over the end of said slot, said gate being hinged at its upper end to the plunger by means of journals $f$ $f$, mounted in bearings $f'$ $f'$ in the plunger. On one side of the gate is a cam-flange G, with the under side of which a projection $g$ on the casting C engages and causes said gate to open through the slotted portion of the plunger. On the opposite side of the gate is a cam-flange G′, having the opposite incline to that of the cam G. With the upper side of this cam G′ a projection $g'$ on the casting C engages and closes said gate as the plunger is drawn up.

H is the measuring seed-cup, formed in the gate on its side approximate to the hopper. Said cup is provided with an adjustable plate H′, by means of which its capacity may be regulated.

I is a bearing formed on the casting C under the bottom $C^2$. K is a spring secured to said bearing by a bolt $i$ and nut $i'$. To the free end of this spring is soldered, or secured in any other suitable manner, a rigid metal cut-off K′, having a bent end $k$, beveled toward the seed-cups, which closes the aperture $a$ in the bottom of the hopper, the main part of the cut-off resting against the side of the gate in which the seed-cup is located, the play of the plunger being so regulated that the slot in the same does not go below the lower end of the cut-off on its downward movement. Secured to the bearing I by the bolt $i$ and nut $i'$ is a washer L, having one or more hooks $l$, which extend through a hole $l'$ in the hopper.

$l^2$ $l^2$ are bearings formed on the upper part of the casting and projecting through holes $l^3$ $l^3$ in said hopper.

M is a spring having the central hook portion $m$, which is hooked on the hook $l$, the ends $m'$ $m'$ resting in the bearings $l^2$ $l^2$ and the long arms $m^2$ $m^2$, the lower ends of which are bent and engage with holes in the scraper-plate N and serve to hold said plate in position, the upper end of the plate resting against the extreme lower end of the hopper, and its lower end resting against the casting C below the seed-passage in the same. By this arrangement of the spring the scraper may readily be removed, or may be reversed, when desired.

O is an adjustable stop secured to the lower slotted end of the standard by bolts $o$, passing through slots $o'$ in the stop and provided with suitable nuts.

The operation of my invention is as follows: The hopper being filled with corn, the plunger, as shown in Fig. 3, is drawn up and the seed-cup communicates with the hopper, its bottom forming a seed-passage which directs the corn to said seed-cup. As the plunger is moved down, the seed-cup fills, and as it passes the cut-off any extra kernels are removed, the cut-off, however, yielding sufficiently to prevent any grains from clogging or becoming crushed at the top of the cup and lifts sufficiently to allow them to pass without being crushed. Said cut-off, being supported entirely by the spring, yields throughout its entire length, so as to prevent any injury to the corn. As the plunger passes down, the projection $g$ engages with the cam-flange G, swings the gate through the slot in the standard, and the contents of the cup are discharged and fall into the seed-passage D, the position of the plunger at the limit of its downward movement being shown in dotted lines, Fig. 3. The plunger then closing the bottom of the seed-passage, the corn rests against said plunger. As said plunger is drawn up, the seed-cup closes and is again filled. When drawn up, the end of the plunger comes above the bottom of the seed-passage and the corn is discharged into the space between the lower end of the scraper and casting. On the next downward movement of the plunger it forces the lower end of the scraper away from the casting and discharges the corn into the ground.

My improved planter is composed of but few parts, which are simple in their construction and not liable to get out of order, the bottom of the hopper, ways or guides for the plunger, seed-passage, and lower end of planter and ways all being formed in one casting. My said planter may be manufactured cheaply and is very effective in service.

Having thus fully described my invention, I claim as new and desire to secure by Letters Patent—

1. In a hand corn-planter, the combination, with a standard and a hopper secured thereto, of a plunger mounted in suitable guides within said hopper, said plunger consisting of two parts jointed or hinged together, the lower one of said parts having a seed-measuring cup adapted to communicate with the hopper, as specified.

2. In a hand corn-planter, a plunger for actuating the seed-cup, the upper portion of said plunger consisting of two parallel rods located opposite one of the faces of the standard and arranged to play up and down within the confines of the hopper, said rods provided with a handle at their upper ends, and means whereby the rods are held parallel with the standard when in use, substantially as set forth.

3. In a hand corn-planter, a standard A, with a hopper B connected with and projecting from one of its faces, in combination with a plunger for actuating the seed-cup, the upper portion of said plunger consisting of two parallel rods adjusted close to the standard and upon that side occupied by the hopper, said rods projecting downward within the confines of the hopper and provided at the top with a handle, substantially as described.

4. In a hand corn-planter, a standard with a hopper projecting from one of its faces and a plunger for actuating the seed-cup, the upper portion of said plunger consisting of two rods ranged side by side upon that side of the standard from which the hopper projects and projecting down within the confines of the hopper, said rods provided with a handle at the top and with stop mechanism projecting from said rods and adapted to limit the throw of the plunger, substantially as described.

5. In a hand corn-planter, a standard slotted above the hopper, a hopper projecting from one of the faces of the standard, a plunger for actuating the seed-cup, the upper portion of said plunger consisting of parallel rods arranged opposite the face of the standard and projecting down within the confines of the hopper, and a stop upon said rods projected into said slot, whereby the throw of the plunger is limited, substantially as described.

6. In a hand corn-planter, a standard with a hopper projecting from one of its faces and a plunger for actuating the seed-cup, the upper portion of said plunger consisting of parallel rods arranged on one face of the plunger and extending down within the confines of the hopper, said rods provided with stops upon the same for limiting the motion of the plunger, said stops formed by bending the said metal so as to constitute a shoulder adapted to come into contact with a permanent bearing on the standard, substantially as described.

7. In a hand corn-planter, a standard having its lower end slotted, a hopper secured to said standard, and a cut-off located at the bottom of the hopper, in combination with a plunger mounted in suitable guides and passing through the hopper and having its upper end slotted, a gate hinged in the slotted portion of the plunger, a seed-cup formed in the side of the hinged gate approximate to the cut-off, a cam on said gate, and a projection engaging with said cam, all constructed, arranged, and operating substantially as shown and described, whereby as the plunger descends and carries the seed-cup below the bottom of the hopper the projection will engage with the cam on the gate, swing the same through the slotted portion of the standard, and effect the discharge of the seed.

8. In a hand corn-planter, a standard having its lower end slotted, a hopper secured to said standard, a cut-off located at the bottom of the hopper, and a seed-passage projecting through the lower slotted end of the standard on its side opposite to the hopper, in combination with a plunger mounted in suitable guides and passing through the hopper and having its upper end slotted, a gate hinged in said slotted portion of the plunger, a seed-cup formed in the side of the gate approximate to the cut-off, a cam on said gate, and a projection engaging with said cam, all constructed, arranged, and operating substantially as shown and described, whereby as the plunger descends and carries the seed-cup below the bottom of the hopper the projection will engage with the cam on the gate, swing the same through the slot in the standard, and discharge the seed into the seed-passage.

9. In a hand corn-planter, a standard having its lower end slotted, a casting secured to and projecting below the lower end of the standard, a seed-passage formed on said casting and projecting through the slot in the standard, a hopper secured to said standard, a cut-off located at the bottom of the hopper, a scraper-plate engaging with the casting below the discharge end of the seed-passage, and a spring holding said plate in position, in combination with a plunger mounted in guides and passing through the hopper and having its upper end slotted, a gate hinged in said slotted portion of the plunger, a seed-cup formed in the side of the plunger approximate to the cut-off, a cam on said hopper, and a projection engaging with said cam and operating to swing the gate through the slot in the standard and discharge the seed into the seed-passage on the downward movement of the plunger, all constructed and arranged substantially as shown and described.

10. In a hand corn-planter, the standard A, having its lower end slotted, the hopper B, secured thereto, and a cut-off located in the bottom of said hopper, in combination with the plunger E, having its upper end slotted, the swinging gate F, hinged in said slotted portion of the plunger, and a seed-cup H, formed in the side of said gate approximate to the cut-off and provided with an adjustable plate H′ for regulating the capacity of said seed-cup, all constructed and arranged substantially as shown and described.

11. In a hand corn-planter, the standard A, the hopper B, secured thereto and having the bottom $C^2$, provided with the aperture $a$, the bearing I, the spring K, secured to said bearing, the cut-off K′, secured to and held in position by the spring K, and having the bent upper end $k$ located in the aperture $a$, in combination with the plunger E, having hinged gate F and seed-cup H in its side approximate to the cut-off, all constructed, arranged, and operating substantially as shown and described.

12. In a hand corn-planter, the standard A, having its lower end slotted, the hopper B, the casting C, secured to the lower end of the hopper, having formed integral therewith the wings $c'$ $c'$, the seed-passage D, projecting through the slotted portion of the standard, and the bottom $C^2$ of the hopper having the aperture $a$ therein, and the bearing I, the cut-off K′, located in the aperture $a$ and supported and held in place by the spring K, secured to the bearing I, the scraper-plate N, the spring M, holding said plate in position, and the adjustable stop O, in combination with the plunger E, mounted in suitable bearings and passing through the hopper and having its upper end slotted, a gate F, hinged in the slotted portion of the plunger and having a seed-cup H formed in its side approximate to the cut-off, cams G G′ on the gate, and projections $g$ $g'$ on the casting engaging with said cams, all constructed, arranged, and operating substantially as shown and described.

13. In a hand corn-planter, the combination of the standard A, hopper B, secured thereto, a cut-off at the bottom of the hopper, a plunger E, mounted in suitable guides passing through the hopper and having its upper end slotted, a gate F, hinged in the slotted portion of the plunger, having a seed-cup H formed in its side approximate to the cut-off, and curved grooves $e$ in the upper corners of said plunger, the iron handle-rods E′, having the bent ends secured in the grooves $e$ $e$, and the knee or stop $e^2$, engaging with a slot $b$ in the standard to limit the play of said plunger, all constructed, arranged, and operating substantially as shown and described.

In testimony whereof I affix my signature in presence of two witnesses.

JOSEPH M. SEGUR.

Witnesses:
M. A. REEVE,
WALTER H. CHAMBERLIN.